United States Patent
Goel et al.

(10) Patent No.: US 10,718,556 B2
(45) Date of Patent: Jul. 21, 2020

(54) HVAC SYSTEMS AND METHODS WITH IMPROVED STABILIZATION

(71) Applicant: Lennox Industries Inc., Richardson, TX (US)

(72) Inventors: Rakesh Goel, Irving, TX (US); Eric Berg, The Colony, TX (US)

(73) Assignee: Lennox Industries Inc., Richardson, TX (US)

( * ) Notice: Subject to any disclaimer, the term of this patent is extended or adjusted under 35 U.S.C. 154(b) by 318 days.

(21) Appl. No.: 15/847,829

(22) Filed: Dec. 19, 2017

(65) Prior Publication Data

US 2018/0112900 A1 Apr. 26, 2018

Related U.S. Application Data

(63) Continuation-in-part of application No. 14/625,609, filed on Feb. 18, 2015, now abandoned.

(51) Int. Cl.
*F25B 41/06* (2006.01)
*G01K 1/14* (2006.01)
(Continued)

(52) U.S. Cl.
CPC ........ *F25B 41/062* (2013.01); *F24F 11/0001* (2013.01); *F25B 29/003* (2013.01); *G01K 1/143* (2013.01); *G01K 1/16* (2013.01); *F24F 2110/40* (2018.01); *F25B 39/028* (2013.01); *F25B 2313/0291* (2013.01); *F25B 2341/06* (2013.01);
(Continued)

(58) Field of Classification Search
CPC .............. F25B 41/062; F25B 2341/068; F25B 2341/0683; G01K 1/16; G01K 1/18; G01K 1/143
See application file for complete search history.

(56) References Cited

U.S. PATENT DOCUMENTS

| | | | | |
|---|---|---|---|---|
| 2,112,038 A | * | 3/1938 | McLenegan | F24F 3/1405 62/210 |
| 2,302,640 A | * | 11/1942 | Schmidt | G01K 1/143 374/194 |

(Continued)

FOREIGN PATENT DOCUMENTS

| | | | | |
|---|---|---|---|---|
| DE | 102009007948 A1 | * | 9/2010 | ............. F24D 19/10 |
| DE | 102012204898 A1 | * | 10/2013 | ............. G01K 1/143 |

*Primary Examiner* — Christopher R Zerphey
(74) *Attorney, Agent, or Firm* — Hubbard Johnston PLLC

(57) ABSTRACT

Systems and methods are presented for improving stabilization of a heating, ventilating, and air conditioning (HVAC) system. More specifically, the systems and methods include a heat-flow modulator for regulating an exchange of thermal energy between a flow of refrigerant and a sensory bulb. The exchange of thermal energy allows an expansion valve to respond to a refrigerant temperature using an actuator, which is coupled to the sensory bulb. The heat-flow modulator is formed of a body that includes a first contact surface and a second contact surface. The first contact surface is thermally-coupled to a suction line of the HVAC system, which conveys the flow of refrigerant. The second contact surface is thermally-coupled to the sensory bulb. In one instance the heat-flow modulator has variable volume depending on how installed. Other systems and methods are presented. Variable heat-flow modulators are also presented.

18 Claims, 10 Drawing Sheets

(51) Int. Cl.
  *G01K 1/16*    (2006.01)
  *F24F 11/00*   (2018.01)
  *F25B 29/00*   (2006.01)
  *F25B 39/02*   (2006.01)
  *F24F 110/40*  (2018.01)

(52) U.S. Cl.
  CPC . *F25B 2341/068* (2013.01); *F25B 2700/1933* (2013.01)

(56) References Cited

U.S. PATENT DOCUMENTS

| | | | | |
|---|---|---|---|---|
| 3,143,439 A | * | 8/1964 | Hansen | G01K 1/143 136/229 |
| 3,817,053 A | * | 6/1974 | Orth | F25B 41/043 62/210 |
| 5,454,641 A | * | 10/1995 | Parker | G01K 1/16 374/120 |
| 6,334,707 B1 | * | 1/2002 | Ku | G01K 1/143 374/147 |
| 8,152,121 B2 | * | 4/2012 | Thomas | F25B 41/062 248/229.1 |
| 8,152,368 B2 | * | 4/2012 | Weyna | F25D 29/005 374/147 |
| 8,870,455 B2 | * | 10/2014 | Daily | G01K 1/026 374/179 |
| 2007/0237202 A1 | * | 10/2007 | Li | G01K 1/143 374/147 |
| 2012/0193086 A1 | * | 8/2012 | van Dijk | G01K 1/14 165/287 |

* cited by examiner

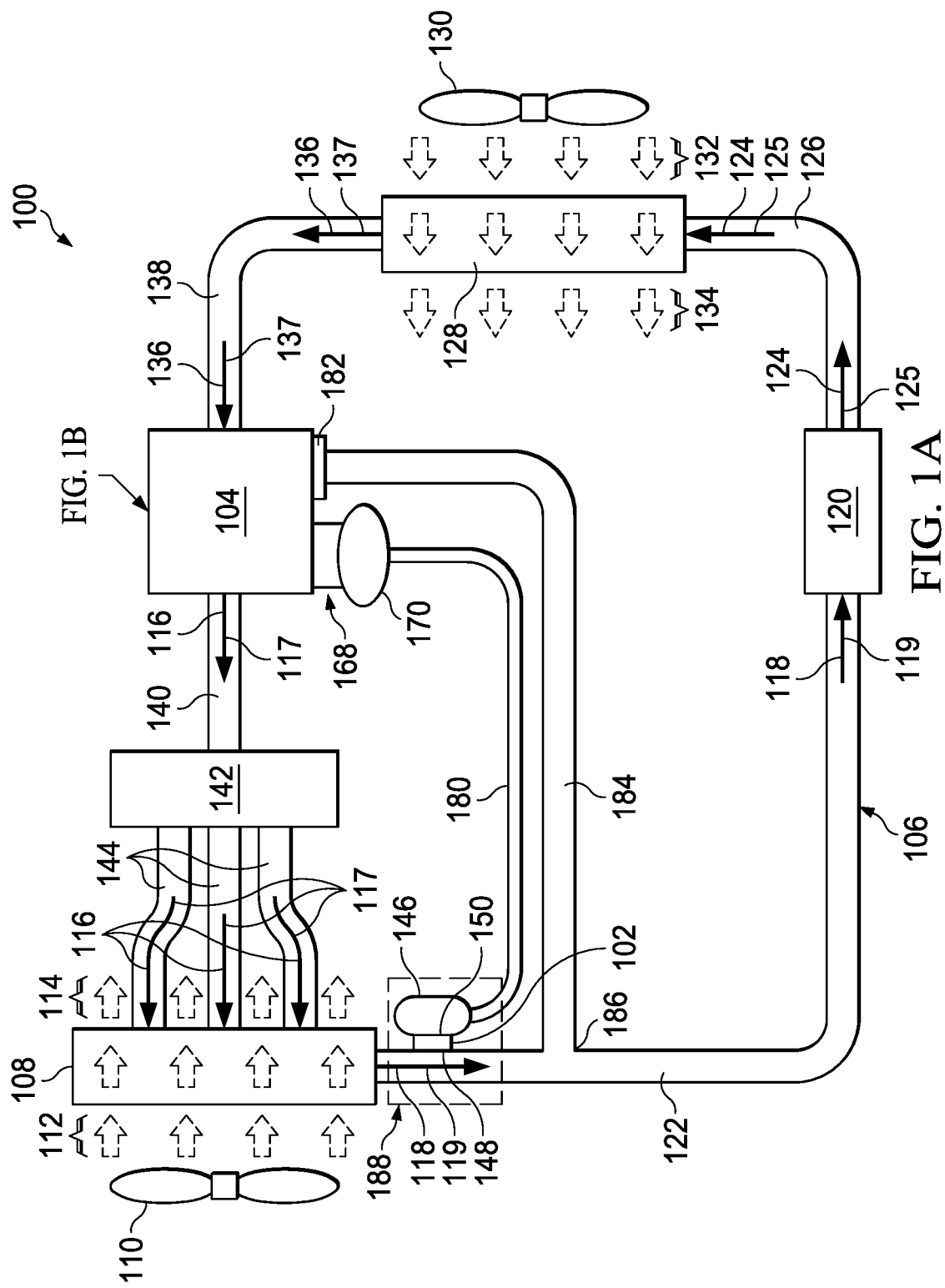

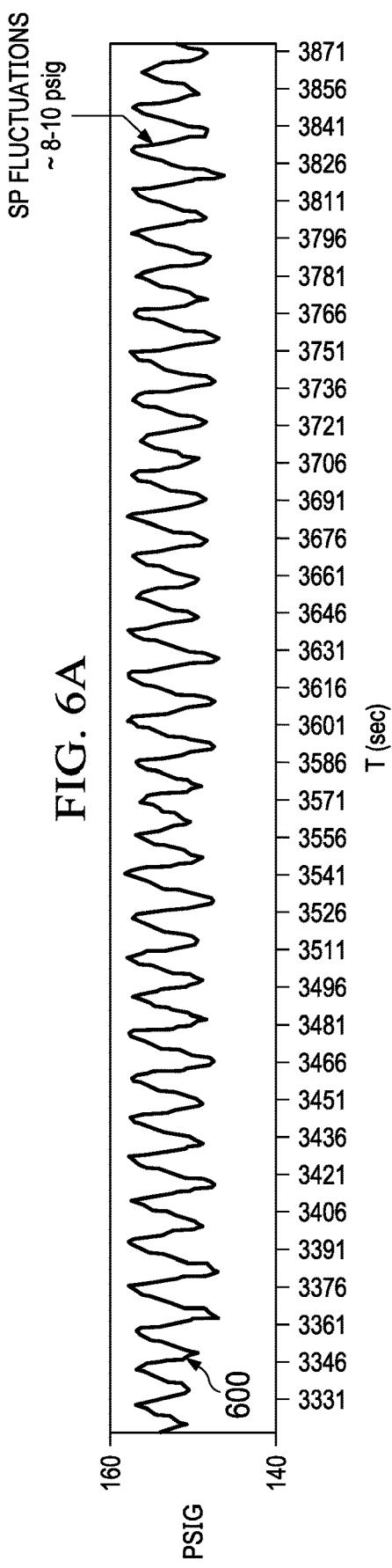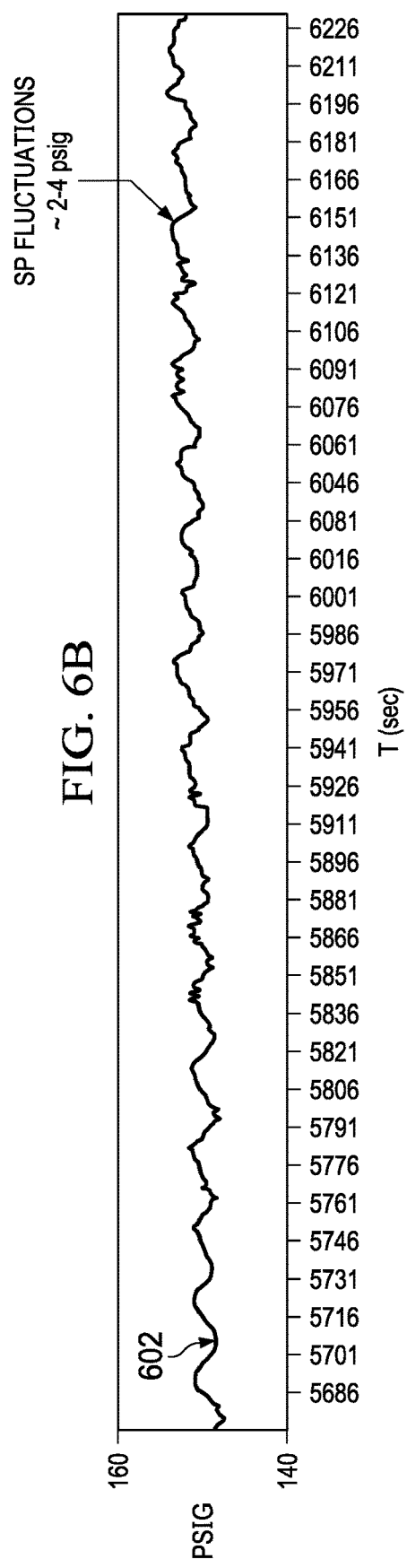

HVAC SYSTEMS AND METHODS WITH IMPROVED STABILIZATION

RELATED APPLICATION

This application is a Continuation-in-Part application of U.S. application Ser. No. 14/625,609 filed Feb. 18, 2015, entitled, "HVAC Systems and Methods with Improved Stabilization," which is hereby incorporated herein by reference for all purposes.

TECHNICAL FIELD

The present disclosure relates generally to heating, ventilating, and air conditioning (HVAC) systems, and more particularly, to HVAC systems and methods with improved stabilization.

BACKGROUND

Heating, ventilating, and air conditioning (HVAC) systems can be used to regulate the environment within an enclosed space. Typically, an air blower is used to pull air (i.e., return air) from the enclosed space into the HVAC system through ducts and push the air into the enclosed space through additional ducts after conditioning the air (e.g., heating, cooling, or dehumidifying the air).

The cooling aspect of an HVAC system may utilize an evaporator that cools return air from the enclosed space. An expansion valve meters refrigerant to the evaporator while receiving the refrigerant from a condenser. The expansion valve, the evaporator, and the condenser form part of a closed-conduit refrigeration circuit of the HVAC system. There are, at times, issues with stable operation of the expansion valve that could benefit from improvements.

BRIEF DESCRIPTION OF THE DRAWINGS

Illustrative embodiments of the present disclosure are described in detail below with reference to the attached drawing figures, which are incorporated by reference herein.

FIG. 1A is a schematic diagram of a heating, ventilating, and air conditioning (HVAC) system having a heat-flow modulator for improving stabilization of an expansion valve, according to an illustrative embodiment;

FIG. 6A is an illustrative graph of performance data for a roof-top HVAC system without a heat-flow modulator showing mainly qualitative nature of the data for partial load;

FIG. 6B is an illustrative graph of performance data for the roof-top HVAC system referenced in FIG. 6A but with a heat-flow modulator and showing mainly qualitative nature of the data for partial load;

Figure 1B:
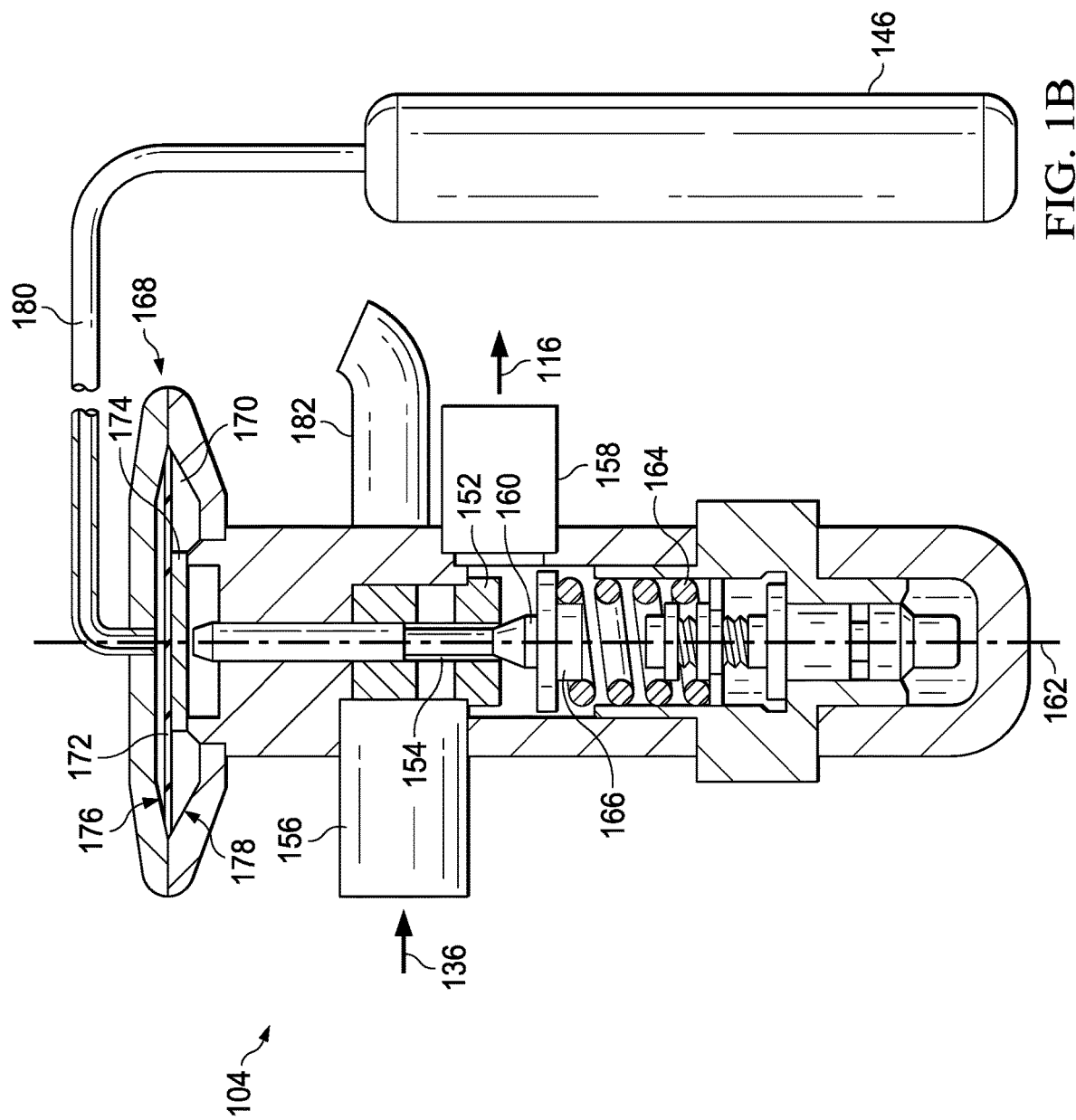
FIG. 1B is a schematic diagram, with a portion shown in cross-section, of the illustrative expansion valve of FIG. 1A, according to an illustrative embodiment.

The figures described above are only exemplary and their illustration is not intended to assert or imply any limitation with regard to the environment, architecture, design, configuration, method, or process in which different embodiments may be implemented.

DETAILED DESCRIPTION OF THE ILLUSTRATIVE EMBODIMENTS

Heating, ventilating, and air-conditioning (HVAC) systems commonly incorporate an expansion valve to regulate a flow of refrigerant from a condenser to an evaporator. The expansion valve, the condenser, and the evaporator are components of a closed-conduit refrigerant circuit, which also includes a compressor and conduits. The closed-conduit refrigerant circuit is operable to circulate refrigerant among its components, thus enabling the evaporator to produce a cooled airflow from unconditioned air.

To regulate the flow of refrigerant between the condenser and the evaporator, the expansion valve incorporates a movable pin that selectively occludes (fully or partially as one skilled in the art would understand) an internal flow orifice. The movable pin displaces along a pin stroke, positions of which, determine a degree of occlusion, or restriction. An actuator is operable to displace the movable pin in response to a refrigerant temperature, which is sensed typically at an output of the evaporator. Such displacement typically occurs against a biasing member, such as a spring. The movable pin ceases its displacement when forces applied by the actuator and the biasing member balance.

As the refrigerant temperature changes, a force applied by the actuator changes and the movable pin adjusts to a new equilibrium point. This adjustment occurs dynamically as refrigerant traverses the expansion valve to flow from the condenser to the evaporator and the refrigerant temperature changes. However, under certain operating conditions, e.g., the HVAC system operating under reduced loads, the movable pin may oscillate around or excessively "hunting" the equilibrium point, causing unstable operation of the expansion valve. The hunting may mean, for example, that the suction pressure oscillates over a greater range than is desired. This unstable operation creates fluctuations in aspects of the flow of refrigerant, especially with regards to refrigerant temperature and pressure. The unstable operation may be seen in suction line pressures and temperatures. These fluctuations negatively impact the HVAC system, reducing its efficiency and potentially damaging components of the closed-conduit refrigeration circuit. The nature of some of the fluctuations will be made clearer further still by considering FIGS. 6A-8B described further below.

The embodiments described herein relate to systems and methods for improving stabilization of a heating, ventilating, and air conditioning (HVAC) system. More specifically, the systems and methods include a heat-flow modulator for regulating or adjusting an exchange of thermal energy between a flow of refrigerant in a suction line and a sensory bulb. Prior hereto, sensory bulbs have typically been applied directly to the suction line with nothing between them and without any effort to adjust the transfer characteristics of thermal energy between the components. The exchange of thermal energy allows an expansion valve to respond to a refrigerant temperature using an actuator, which is coupled to the sensory bulb. The heat-flow modulator is formed of a body that includes a first contact surface and a second contact surface. The first contact surface is thermally-coupled to a suction line of the HVAC system, which conveys the flow of refrigerant. The second contact surface is thermally-coupled to the sensory bulb. The heat-flow modulator is operable to affect a flow of heat between the suction line and the sensory bulb, which includes providing a thermal resistance, a thermal capacitance, or both to the flow of heat. Such control regulates a response of the expansion valve to the refrigerant temperature and allows a pin within the expansion valve to reliably achieve an equilibrium point. Other systems and methods are presented.

Referring now to the drawings and primarily to FIG. 1A, a schematic diagram is presented of a heating, ventilating, and air conditioning (HVAC) system 100 having a heat-flow modulator 102 for improving stabilization of an expansion valve 104, according to an illustrative embodiment. The expansion valve 104 is operable to regulate a flow of refrigerant within the HVAC system 100. The HVAC system 100 includes a closed-conduit refrigeration circuit 106. The closed-conduit refrigeration circuit 106 is shown in FIG. 1A by tubing that represents fluid coupling between components of the closed-conduit refrigeration circuit 106. Sections of tubing 122, 126, 138, 140, 144 correspond to individual conduits of refrigerant and arrows 116, 118, 124, 136 indicate corresponding flows of refrigerant therein (i.e., when refrigerant is present in the HVAC system 100). One skilled in the art would understand that numerous variations may be made to this illustrative embodiment.

The closed-conduit refrigeration circuit 106 includes an evaporator 108 for enabling a cooling capacity of the HVAC system 100. The evaporator 108 typically includes at least one evaporator fan 110 to circulate a return air 112 across one or more heat-exchange surfaces of the evaporator 108. The evaporator 108 is configured to transfer heat from the return air 112 to refrigerant therein. The return air 112 is drawn in from a conditioned space and exits the evaporator 108 as a cooled airflow 114. Concomitantly, a low-pressure liquid refrigerant 117 enters the evaporator 108 and leaves as a low-pressure gas refrigerant 119.

The closed-conduit refrigeration circuit 106 also includes a compressor 120 fluidly-coupled to the evaporator 108 via a suction line 122, or tubing. The suction line 122 is operable to convey the low-pressure gas refrigerant 119 from the evaporator 108 to the compressor 120. During operation, the compressor 120 performs work on the low-pressure gas refrigerant 119, thereby generating a high-pressure gas refrigerant 125. The high-pressure gas refrigerant 125 exits the compressor 120 through a discharge line 126, or tubing. In some embodiments, the compressor 120 includes a plurality of compressors that form a tandem configuration within the closed-conduit refrigeration circuit 106. In such embodiments, the plurality of compressors may be fluidly-coupled to the suction line 122 through a common suction manifold and fluidly-coupled to the discharge line 126 through a common discharge manifold. Other types of fluid couplings are possible.

The closed-conduit refrigeration circuit 106 also includes a condenser 128 that is fluidly-coupled to the compressor 120 via the discharge line 126. The condenser 128 typically includes at least one condenser fan 130 to circulate a non-conditioned air 132 across one or more heat exchange surfaces of the condenser 128. The condenser 128 is configured to transfer heat from refrigerant therein to the non-conditioned air 132. The non-conditioned air 132 exits the condenser 128 as a warmed airflow 134. Concomitantly, the high-pressure gas refrigerant 125 enters the condenser 128 and leaves as a high-pressure liquid refrigerant 137. In some embodiments, the condenser 128 includes a micro-channel condenser.

The closed-conduit refrigeration circuit 106 includes a liquid line 138, or tubing, and a refrigerant line 140, or tubing. The liquid line 138 fluidly-couples the condenser 128 to the expansion valve 104 and is operable to convey the high-pressure liquid refrigerant 137 from the condenser 128 to the expansion valve 104. The refrigerant line 140 fluidly-couples the expansion valve 104 to the evaporator 108 and is operable to convey the low-pressure liquid refrigerant 117 from the expansion valve 104 to the evaporator 108. In some embodiments, a distributor 142 splits the refrigerant line 140 into a plurality of branches 144. These branches 144 transition into a plurality of short heat-transfer circuits (not explicitly shown) upon entry into the evaporator 108. In such embodiments, the plurality of short heat transfer circuits may prevent large drops in pressure that might otherwise occur if a single, long circuit were used.

The expansion valve 104 serves to regulate the flow of refrigerant through the HVAC system 100 and to control a conversion of high-pressure liquid refrigerant 137 into low-pressure liquid refrigerant 117. Such regulation is assisted by a sensory bulb 146, which is fluidly-coupled to the expansion valve 104 and operates cooperatively with the heat-flow modulator 102. The heat-flow modulator 102 includes a first contact surface 148 that is thermally-coupled to the suction line 122 and a second contact surface 150 that is thermally-coupled to the sensory bulb 146. Such thermal coupling enables the heat-flow modulator 102 to regulate, in terms of speed and/or quantity or other characteristics, an amount of thermal energy exchanged between the suction line 122 and the sensory bulb 146. This regulation improves stability of the expansion valve 104 during operation and thereby the HVAC system, e.g., the suction pressure fluctuates less than it would without the flow modulator. For example, the oscillations in the suction pressure of an illustrative, non-limiting roof top HVAC system without a heat-flow modulator may vary between 8-10 psig and with the heat-flow modulator may oscillate only between 2-4 psig; indeed, it appears to reduce oscillations by 40% to 75% in some instances. Additional aspects of illustrative heat-flow modulators are described further in relation to FIGS. 2A-2D, FIGS. 3A-3B, FIG. 5, and FIG. 9.

Referring now primarily to FIG. 1B, a schematic diagram is presented, with a portion shown in cross-section, of an expansion valve suitable for use as the expansion valve 104 of FIG. 1A, according to an illustrative embodiment. It should be understood that the depiction of FIG. 1B is not intended as limiting and is presented for purposes of illustration only. Numerous types of expansion valves are suitable for use in the HVAC system 100 and might be incorporated therein in place of the one illustrated in FIG. 1B. Some features of the expansion valve 104 are shown in both FIGS. 1A and 1B (e.g., the sensory bulb 146). The expansion valve 104 includes a body 152 formed with a flow orifice 154. The flow orifice 154 is operable to convey the flow of refrigerant from an inlet port 156 to an outlet port 158. The inlet port 156 is configured to fluidly-couple the expansion valve 104 to the liquid line 138 of the closed conduit refrigeration circuit 106. The outlet port 158 is configured to fluidly-couple the expansion valve 104 to the refrigerant line 140 of the closed-conduit refrigeration circuit 106.

The expansion valve 104 also includes a pin 160 having a longitudinal axis 162. The pin 160 is operable to control a primary flow of refrigerant through the flow orifice 154, which includes varying an occlusion of the flow orifice 154. The pin 160 is operatively movable along the longitudinal axis 162 between a closed position and an open position. The closed position and the open position define terminal points of a stroke of the pin 160, or pin stroke. In the closed position, the pin 160 occludes the flow orifice 154. Such occlusion may involve the pin 160 sealingly engaging the body 152 along one or more surfaces that define the flow orifice 154. In the open position, the pin 160 substantially unoccludes the flow orifice 154. Motion of the pin 160 within the pin stroke alters the occlusion of the flow orifice 154. As the pin 160 moves from the closed position to the open position, the occlusion progressively decreases. As the pin 160 moves from the open position to the closed position, the occlusion progressively increases. In FIG. 1B, the pin 160 is depicted at a point along the pin stroke between the closed position and the open position.

In some embodiments, the expansion valve 104 includes a spring 164 arranged within the expansion valve 104 so as to bias the pin 160 in the closed position. In such embodiments, a spring guide 166 is typically operable to center the spring 164 along the longitudinal axis 162 of the pin 160. In some embodiments, the pin 160 is disposed through the flow orifice 154, as shown in FIG. 1B. This depiction, however, is not intended as limiting. For example, and without limitation, the pin 160 could be configured to sealingly engage the body 152 proximate the flow orifice 154, but not extend therethrough. Other configurations are possible.

The expansion valve 104 includes an actuator 168 coupled to the pin 160 and configured to move the pin 160 in response to a refrigerant temperature. The refrigerant temperature is sensed adjacent an output of the evaporator 108 via the sensory bulb 146. In some embodiments, the actuator 168 includes a chamber 170 having a diaphragm 172 coupled to the pin 160. This coupling may involve other elements, such as a flexible plate 174. The diaphragm 172 partitions the chamber 170 into a first compartment 176, which is at or near a minimum in FIG. 1B, and a second compartment 178. In such embodiments, the actuator 168 also includes a tube 180 coupling the chamber 170 to the sensory bulb 146. The tube 180, commonly a capillary transmission tube, enables fluid communication between the first compartment 176 of the chamber 170 and the sensory bulb 146.

A fluid is disposed within a volume defined by the first compartment 176, the sensory bulb 146, and the tube 180. The fluid is typically the same as a refrigerant used in the HVAC system 100, although other fluids are possible. The fluid is operable to displace the diaphragm 172 in response to thermal energy entering or exiting the sensory bulb 146. Such displacement adjusts a position of the pin 160, thereby altering the flow of refrigerant through the flow orifice 154. The expansion valve 104 is therefore able to regulate the flow of refrigerant through the HVAC system 100 in response to the refrigerant temperature of the low-pressure gas refrigerant 119 exiting the evaporator 108.

In some embodiments, the expansion valve 104 includes a pressure equalizer port 182 fluidly-coupled to the suction line 122 of the closed-conduit refrigeration circuit 106. In such embodiments, the pressure equalization port 182 enables the expansion valve 104 to sense a refrigerant pressure of the low-pressure gas refrigerant 119 exiting the evaporator 108. The sensed refrigerant pressure is utilized by the expansion valve 104 to adjust the position of the pin 160, thereby altering the flow of refrigerant through the flow orifice 154. This alteration aids in regulating the flow of refrigerant through the HVAC system 100. In some embodiments, the pressure equalizer port 182 is fluidly-coupled to the suction line 122 via a pressure equalization line 184, such as that shown in FIG. 1A. In these embodiments, the pressure equalization line 184 forms a junction 186 with the suction line 122 in close proximity to the output of the evaporator 108. The pressure equalizer port 182 is configured to receive refrigerant from the suction line 122 and convey such refrigerant into the second compartment 178 and against the diaphragm 172 (or flexible plate 174). The diaphragm 172 (or flexible plate 174) may displace when contacted by such refrigerant, i.e., displace in response to the refrigerant pressure, thereby adjusting the position of the pin 160.

It will be appreciated that the expansion valve 104, when including the pressure equalization port 182, uses the refrigerant temperature and the refrigerant pressure in combination to regulate the flow of refrigerant in the HVAC system 100. For embodiments that incorporate both the sensory bulb 146 and the pressure equalization line 184—such as that depicted in FIG. 1A—the junction 186 is typically adjacent, but downstream a portion 188 of the HVAC system 100 that contains the sensory bulb 146. More specifically, the portion 188 contains a segment of the suction line 122 thermally-coupled to the sensory bulb 146 via the heat-flow modulator 102. However, other locations of the junction 186 are possible.

Now referring again primarily to FIG. 1A, the HVAC system 100 includes a refrigerant disposed therein (e.g., see arrows 116, 118, 124, 136). The closed-conduit refrigeration circuit 106 serves to convey refrigerant between components of the HVAC system 100 (e.g., the expansion valve 104, the evaporator 108, the compressor 120, the condenser 128, etc.). Individual components of the closed-conduit refrigeration circuit 106 then manipulate the refrigerant to generate the cooled airflow 114.

In operation, the evaporator 108 receives the low-pressure liquid refrigerant 117 as a cold fluid from the expansion valve 104 via the refrigerant line 140 and, if present, the distributor 142 and associated plurality of branches 144. The cold, low-pressure liquid refrigerant 117 flows through the evaporator 108 and, while therein, absorbs heat from the return air 112. Such heat absorption maybe aided by the at least one evaporator fan 110 and the one or more heat-exchange surfaces of the evaporator 108. The at least one evaporator fan 110 enables a forced convection of return air 112 across the one or more heat-exchange surfaces of the evaporator 108. Absorption of heat by the cold, low-pressure liquid refrigerant 117 induces a conversion from liquid to gas (i.e., boiling) of refrigerant within the evaporator 108. The cold, low-pressure liquid refrigerant 117 therefore leaves the evaporator 108 as a warm, low-pressure gas refrigerant 119. Concomitantly, the return air 112 exits the evaporator 108 as the cooled airflow 114.

Conversion of the cold, low-pressure liquid refrigerant 117 into the warm, low-pressure gas refrigerant 119 often produces a superheated refrigerant whose temperature exceeds a saturated boiling point. Superheated refrigerant is generated when warm, low-pressure gas refrigerant 119 continues to absorb heat after changing from liquid to gas. Such absorption occurs predominantly within the evaporator 108, but may also occur within the suction line 122. A degree of superheat is typically measured in terms of temperature (e.g., ° F., ° C., K) and refers to a difference in temperature between the superheated refrigerant and its saturated boiling point.

After leaving the evaporator 108, the warm, low-pressure gas refrigerant 119 traverses the suction line 122 of the closed-circuit refrigeration circuit 106 and enters the compressor 120. The compressor 120 performs work on the warm, low-pressure gas refrigerant 119, producing a hot, high-pressure gas refrigerant 125. The hot, high-pressure gas refrigerant 125 exits the compressor 120 via the discharge line 126 and travels to the condenser 128. The hot, high-pressure gas refrigerant 125 flows through the condenser 128, and while therein, transfers heat to the non-conditioned air 132. Such heat transfer may be assisted by the at least one condenser fan 130 and the one or more heat-exchange surfaces of the condenser 128. The at least one condenser fan 130 enables a forced convection of non-conditioned air 132 across the one or more heat-exchange surfaces of the condenser 128. Loss of heat from the hot, high-pressure gas refrigerant 125 induces a conversion from gas to liquid (i.e., condensing) within the condenser 128. The hot, high-pressure gas refrigerant 125 therefore leaves the condenser 128 as a warm, high-pressure liquid refrigerant 137. Concomitantly, the non-conditioned air 132 exits the condenser 128 as the warmed airflow 134.

Conversion of the hot, high-pressure gas refrigerant 125 into the warm, high-pressure liquid refrigerant 137 often produces a subcooled refrigerant whose temperature is below a saturated condensation point. Subcooled refrigerant is generated when warm, high-pressure liquid refrigerant 137 continues to lose heat after changing from gas to liquid. Such loss occurs predominantly within the condenser 128, but may also occur within the liquid line 138. A degree of subcooling is typically measured in terms of temperature (e.g., ° F., ° C., K) and refers to a difference in temperature between the subcooled refrigerant and its saturated condensing point.

After leaving the condenser 128, the warm, high-pressure liquid refrigerant 137 flows through the liquid line 138 to reach the expansion valve 104. As explained more below, passage of the warm, high-pressure liquid refrigerant 137 through the flow orifice 154 induces a lowering of pressure and temperature that generates the cold, low-pressure liquid refrigerant 117. The position of the pin 160 relative the flow orifice 154 serves to regulate flow through the expansion valve 104, and hence, generation of the cold, low-pressure liquid refrigerant 117. The cold, low-pressure liquid refrigerant 117 is then conveyed to the evaporator 108 by the refrigerant line 140 (and, if present, the distributor 142 and associated plurality of branches 144).

It will be appreciated that the closed-conduit refrigeration circuit 106 circulates the refrigerant to allow repeated processing by the evaporator 108, the compressor 120, the condenser 128, and the expansion valve 104. Repeated processing, or cycles, enables the HVAC system 100 to continuously produce the cooled airflow 114 during operation. During such cycling, the expansion valve 104 regulates the flow of refrigerant through the HVAC system 100, which includes receiving the warm, high-pressure liquid refrigerant 137 from the condenser 128 and metering the cold, low-pressure liquid refrigerant 117 to the evaporator 108. The former flow influences the degree of subcooling and the latter flow influences the degree of superheat. Higher degrees of superheat reduce a risk that the warm, low-pressure gas refrigerant 119 will enter the compressor 120 with a non-zero liquid fraction. Higher degrees of subcooling reduce a risk that the warm, high-pressure liquid refrigerant 137 will enter the expansion valve 104 with a non-zero gas fraction.

Now referring again primarily to FIG. 1B, the expansion valve 104 regulates refrigerant flowing through the HVAC system 100 by receiving refrigerant through the inlet port 156 (see arrow 136). This received refrigerant traverses the body 152 and exits the outlet port 158 (see arrow 116). A presence of refrigerant within the body 152 enables the pin 160 to fluidly-couple to the flow orifice 154. Such fluid coupling includes impeding refrigerant flowing through the flow orifice 154 (i.e., with the pin 160). When the pin 160 is in the open position, the flow of refrigerant exhibits a maximum magnitude. When the pin 160 is in the closed position, the flow of refrigerant substantially ceases. Between the open position and the closed position, i.e., along the pin stroke, the flow of refrigerant varies in magnitude between the maximum magnitude and substantially zero, respectively.

When the pin 160 is in the open position, the expansion valve 104 operates at "full load". The expansion valve 104, however, can transition into "part load" operation if the pin 160 moves along the pin stroke towards the closed position. "Part load" operation corresponds to that portion of the pin stroke where the flow of refrigerant exhibits a reduced, non-zero magnitude relative to the maximum magnitude. For example, and without limitation, "part load" operation may correspond to that portion of the pin stroke where the flow of refrigerant is 50% or below that of the maximum magnitude. If the pin 160 moves into the closed position, the expansion valve 104 transitions into "no load" operation. In "no load" operation, the flow of refrigerant substantially ceases.

During operation, a plurality of forces acts on the pin 160 to determine the position of the pin 160 within the pin stroke. Refrigerant flowing from the inlet port 156 through the flow orifice 154 impinges on the pin 160, biasing the pin 160 towards the open position and contributing to an opening force. The actuator 168 also contributes to the opening force depending on the refrigerant temperature, which is typically sensed proximate the output of the evaporator. For embodiments where the actuator 168 incorporates the diaphragm 172, such as that illustrated in FIG. 1B, the diaphragm 172 flexes in response to thermal energy transferring into or out of the fluid. Such transfer typically occurs at the sensory bulb 146, which is thermally-coupled to the suction line 122 through the heat-flow modulator 102. Because the fluid is sealed in the volume defined by the first compartment 176, the sensory bulb 146, and the tube 180, thermal energy entering the fluid causes an increase in pressure that displaces the diaphragm 172 towards the body 152. Conversely, thermal energy leaving the fluid causes a decrease in pressure that allows the diaphragm to relax away from the body 152. By virtue of its coupling to the pin 160, the diaphragm 172 contributes to the opening force when thermal energy enters the fluid. Such contribution decreases in magnitude when thermal energy leaves the fluid.

The spring 164 biases the pin 160 towards the closed position and contributes to a closing force. The strength of such bias increases as the pin 160 moves towards the open position, i.e., the spring 164 becomes increasingly compressed. An initial spring bias is typically determined by selecting an initial compression of the spring 164. The pressure equalizer port 182, if present, may also contribute to the closing force depending on the refrigerant pressure, which is typically sensed proximate the output of the evaporator (e.g., at the junction 186). The pressure equalizer port 182 is fluidly-coupled to the diaphragm 172 via the second compartment 178. Such fluid-coupling allows the refrigerant pressure to be conveyed from the pressure equalizer port 182, through the second compartment 178, and against the diaphragm 172. The refrigerant pressure displaces the diaphragm 172 away from the body 152 which, by virtue of its coupling to the pin 160, contributes to the closing force. This contribution increases or decreases as the refrigerant pressure, respectively, increases or decreases.

As refrigerant flows through the expansion valve 104, the pin 160 translates along the pin stroke until an equilibrium point is reached where the opening force balances the closing force. The equilibrium point changes dynamically in response to the refrigerant temperature and, in some embodiments, the refrigerant pressure. When integrated into the HVAC system 100, it will be appreciated that the expansion valve 104 translates the pin 160 to meter refrigerant to the evaporator and to maintain a substantially constant degree of superheat therein. Thus, the expansion valve 104 sustains HVAC operating efficiencies while transitioning between "full load", "part load", and "no load" (i.e., as cooling demands on the evaporator 108 change). The expansion valve 104 also influences the degree of subcooling in the condenser. Translation of the pin 160 along the pin stroke alters refrigerant flow through the inlet port 156, which due to fluid-coupling with the condenser 128, varies a residence time of refrigerant flowing therein.

During certain operating conditions, the expansion valve 104 may become susceptible to unstable regulation of the flow of refrigerant. For example, and without limitation, the HVAC system 100 may experience a reduced cooling demand that forces the expansion valve 104 into "part load," or partial load, operation. If this "part load" operation corresponds to a small fraction of "full load" operation, e.g., less than 30% of the maximum magnitude, the pin 160 may experience difficulty finding the equilibrium point.

More specifically, the actuator 168 may contribute to the opening force in such a manner as to cause the pin 160 to oscillate around or excessively "hunt" the equilibrium point. Such oscillation or "hunting" may cause undesirable fluctuations the flow of refrigerant (e.g., unstable suction pressure in refrigerant flowing through the suction line 122).

To mitigate this behavior, the heat-flow modulator 102 adjusts the thermal energy transfer rate to provide enhanced stability. The heat-flow modulator 10 provides a thermal resistance, a thermal capacitance, or both to a flow of heat caused by changes in refrigerant exiting the evaporator 108 (e.g., changes in the refrigerant temperature). These thermal characteristics aid the heat-flow modulator 102 in smoothing or delaying the flow of heat between the suction line 122 and the sensory bulb 146. The actuator 168 is therefore allowed sufficient time to apply a steady force onto the pin 160, allowing the pin 160 to reliably find the equilibrium point. Thus, the heat-flow modulator 102, in cooperation with expansion valve 104, ensures a controlled flow of refrigerant in the closed-conduit refrigeration circuit 106 and an improved stability of the HVAC system 100.

Figure 2A:
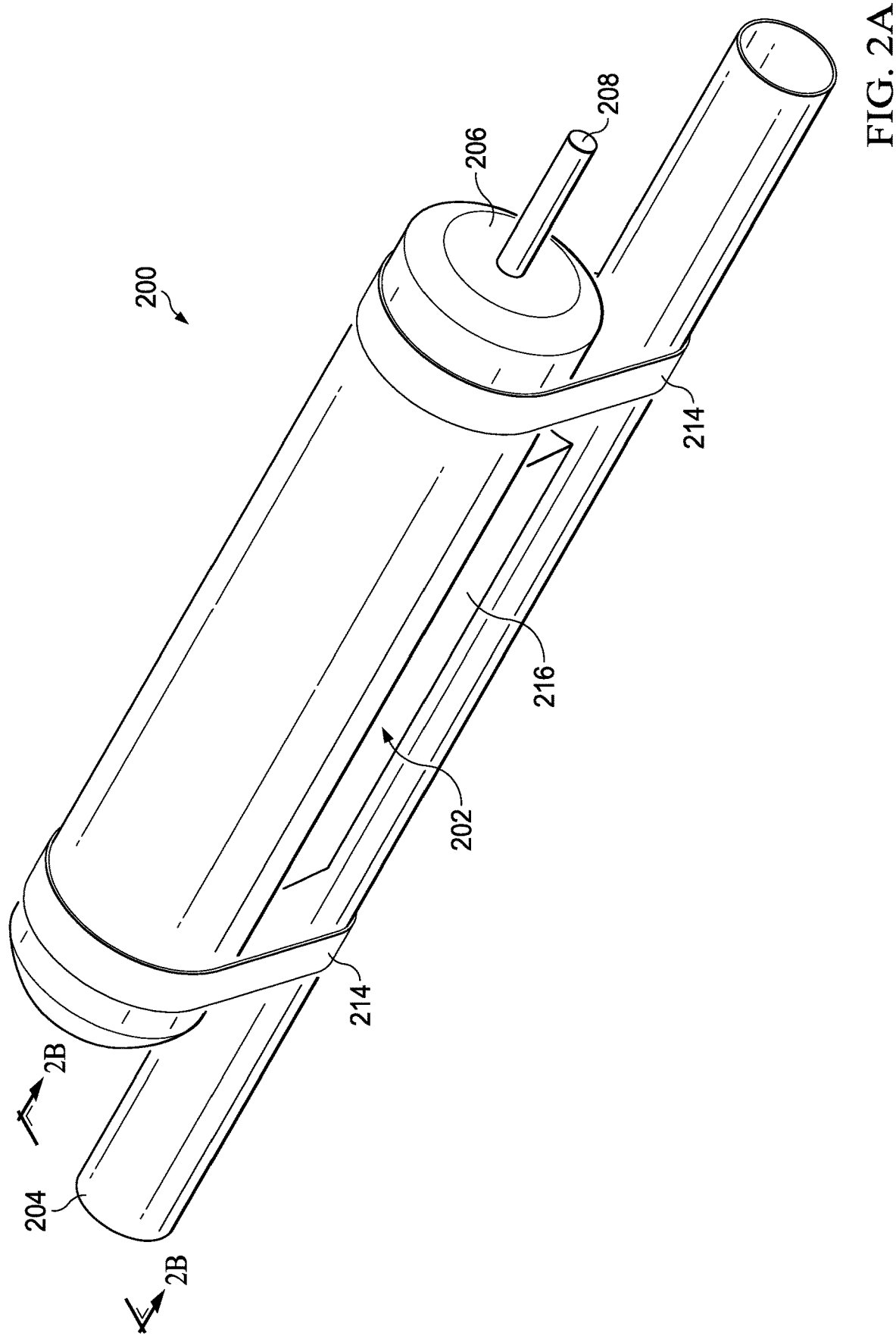
FIG. 2A is a schematic perspective view of a portion of a heating, ventilating, and air conditioning (HVAC) system having a heat-flow modulator for improved stability, according to an illustrative embodiment.
Figure 2B:
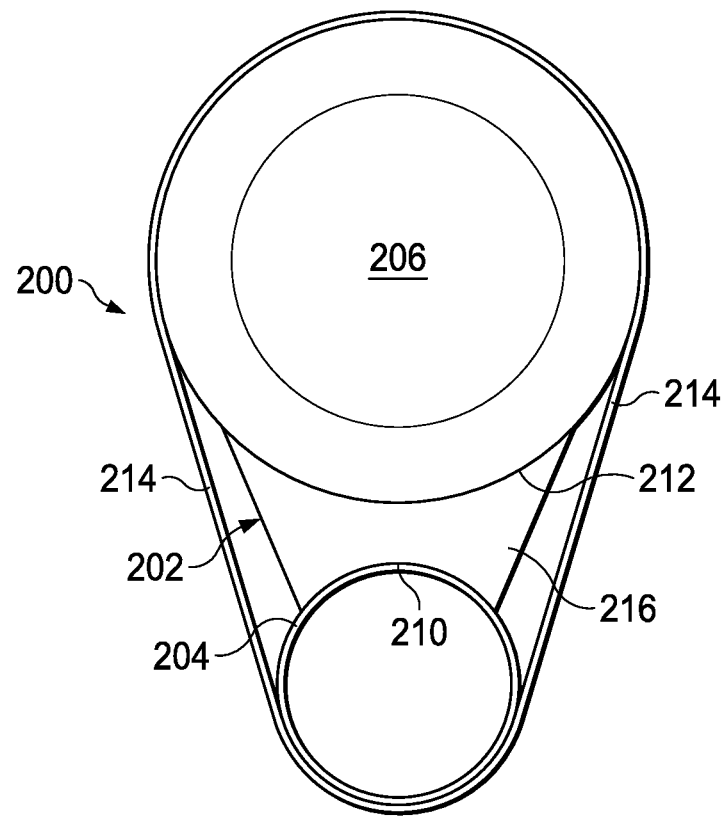
FIG. 2B is a rear elevation view of the portion of the heating, ventilating, and air conditioning (HVAC) system shown in FIG. 2A.

Now referring primarily to FIG. 2A, a perspective view is presented of a portion 200 of a heating, ventilating, and air conditioning (HVAC) system having a heat-flow modulator 202 for improved stability, according to an illustrative embodiment. FIG. 2B presents a rear elevation view of the portion 200. The portion 200 of FIG. 2A is analogous to the portion 188 of FIG. 1A. The portion 200 includes a section 204 of a suction line immediately downstream of an evaporator (see 108 in FIG. 1A). The portion 200 also includes a sensory bulb 206 thermally-coupled to the section 204 via the heat-flow modulator 202. The sensory bulb 206 incorporates a tube 208 for fluidly-coupling to an actuator of an expansion valve. For purposes of illustration, the tube 208 is presented only partially in FIG. 2A.

The heat-flow modulator 202 includes a first contact surface 210 and a second contact surface 212 (see FIG. 2B). The first contact surface 210 is thermally-coupled to the section 204 of the suction line and the second contact surface 212 is thermally-coupled to the sensory bulb 206. This thermal coupling typically involves direct contact. However, in some embodiments, a thermal interface material (TIM) may be disposed between the first contact surface 210 and the section 204, the second contact surface 212 and the sensory bulb 206, or both. In such embodiments, the thermal interface material influences heat flow between neighboring components and may also secure one component to another. Non-limiting examples of thermal interface materials include thermal paints, frits, solders, pastes, epoxies, tapes, and glues. In some embodiments, the portion 200 of the HVAC system includes at least one bracket member 214 for urging the section 204 of the suction line (or portion thereof) towards the first contact surface 210. In these embodiments, the at least one bracket member 214 also urges the sensory bulb 206 (or portion thereof) towards the second contact surface 212. The at least one bracket member 214 may be configured to influence heat flow between the section 204 and the sensory bulb 206 (e.g., increase heat transfer between the section 204 and the sensory bulb 206).

Figure 2C:
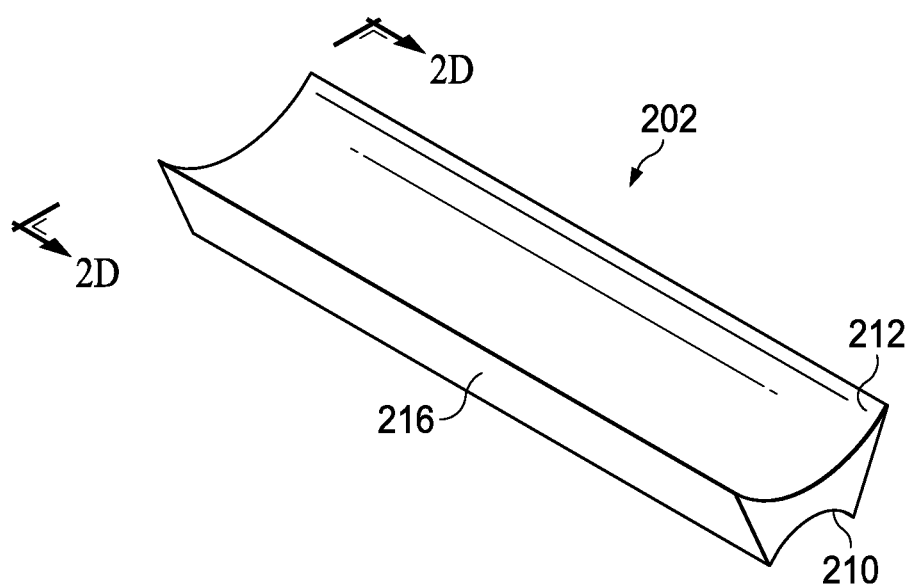
FIG. 2C is a schematic perspective view of a body of the heat-flow modulator of FIG. 2A, according to an illustrative embodiment.
Figure 2D:
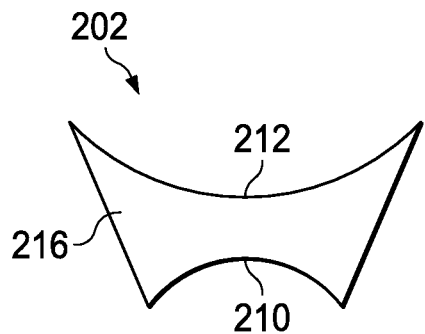
FIG. 2D is a rear elevation view of the body shown in FIG. 2C.

The heat-flow modulator 202 typically includes a body 216, or modulator body, that incorporates the first contact surface 210 and the second contact surface 212. The body 216 may be deformable. The body 216 is configured to provide a thermal resistance, a thermal capacitance, or both to heat flowing between the first contact surface 210 and the second contact surface 212. FIG. 2C shows a perspective view of the body 216 of the heat-flow modulator 202. A rear elevation view of the body 216 is shown in FIG. 2D. The body 216, in cooperation with the first contact surface 210 and the second contact surface 212, is operable to direct heat flow between the sensory bulb 206 and the section 204 of the suction line. Dimensions of the body 216 (e.g., length, width, height, etc.) and its shape may be selected to direct heat along a predetermined thermal flow path. In some embodiments, the first contact surface 210 is formed on the body 216 as a first concave portion and the second contact surface 212 is formed as a second concave portion that faces away from the first concave portion. In other embodiments, the body 216 may have a rectilinear cross-section such as a square or rectangular cross-section. Other dimensions and shapes, however, are possible.

In some embodiments, the body 216 is formed from a thermally-insulating material. The thermally-insulating material may have a thermal conductivity less than 1 W/(m·K). In other embodiments, the body 216 is formed from a thermally-conducting material. The thermally-conducting material may have a thermal conductivity greater than 10 W/(m·K). It will be appreciated that the body 216 is not limited to a single material, but in certain embodiments, may be formed from a plurality of materials (e.g., a textured composite). In these embodiments, the plurality of materials may be selected to impart predetermined thermal resistances and thermal capacitances to the body 216. The plurality of materials may also be structured within the body 216 to constrain heat substantially along the predetermined thermal flow path.

In operation, the section 204 of the suction line conveys refrigerant from the evaporator towards a compressor and thereby attains an operating temperature that reflects a refrigerant temperature of refrigerant exiting the evaporator. If the operating temperature is greater than a temperature of the sensory bulb 206, heat will traverse the heat-flow modulator 202 to flow from the section 204 to the sensory bulb 206. If the operating temperature is less than the temperature of the sensory bulb 206, heat will flow in an opposite direction, traversing the heat-flow modulator 202 to flow from the sensory bulb 206 to the section 204.

Heat enters and leaves the body 216 substantially through the first contact surface 210 and the second contact surface 212. Moreover, after entering the body 216, heat flows substantially along the predetermined thermal flow path and experiences a resistance. This resistance stems from the thermal resistance, which retards a rate of heat transfer between the first contact surface 210 and the second contact surface 212. This resistance may also be influenced by the thermal capacitance, which smoothes the rate of heat transfer between the first contact surface 220 and the second contact surface 212. Thus, the body 216, by providing the thermal resistance, the thermal capacitance, or both, enables the heat-flow modulator 202 to regulate heat exchanged between the section 204 of the suction line and the sensory bulb 206.

Figure 3A:
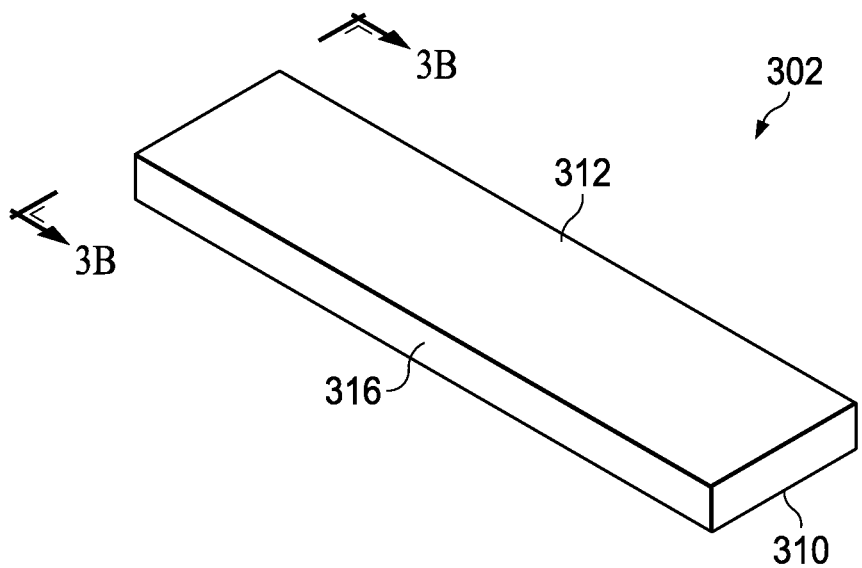
FIG. 3A is a perspective view of a body of a heat-flow modulator having a rectangular cross-section, according to an illustrative embodiment.
Figure 3B:
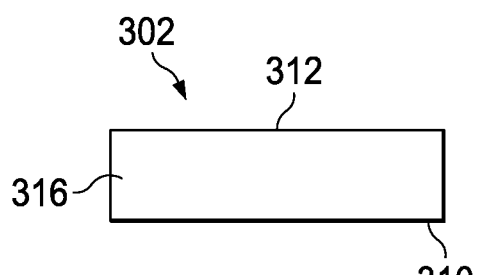
FIG. 3B is a rear elevation view of the body is shown in FIG. 3A.

Although the heat-flow modulator 202 is depicted in FIGS. 2A-2D as having a body 216 with concave portions, this depiction is not intended as limiting. The body 216 may have other portions or shapes and still remain with the scope of this disclosure. For example, and without limitation, FIG. 3A presents a perspective view of a body 316 of a heat-flow modulator 302 having a rectangular cross-section. The body 316 has a first contact surface 310 and a second contact surface 312 defined by planar, parallel portions. The rectangular cross-section is highlighted in FIG. 3B, which shows a rear view of the body 316. Features analogous to both FIGS. 3A-3B and FIGS. 2A-2C are related via coordinated numerals that differ in increment by a hundred. See also heat-flow modulators of FIGS. 5 and 9.

According to an illustrative embodiment, a heat-flow modulator includes an insulating body that is operatively disposed between a portion of a suction line and a sensory bulb of an expansion valve. The insulating body has a first contact surface and a second contact surface. The first contact surface is thermally-coupled to the portion of the suction line and the second contact surface is thermally-coupled to the sensory bulb. The heat-flow modulator also includes a mounting bracket. The mounting bracket is operable to urge the portion of the suction line toward the first contact surface and to urge the sensory bulb (or a portion thereof) towards the second contact surface. During operation, refrigerant flows through the portion of the suction line. In response, heat is exchanged substantially through the mounting bracket between the portion of the suction line and the sensory bulb. A temperature of the portion is therefore communicated to the sensory bulb solely through the mounting bracket. The temperature of the portion may represent a temperature of refrigerant flowing therein.

According to an illustrative embodiment, a heat-flow modulator includes a body having an arc-shaped cross-section. The body is typically formed of an insulating material and has a length that varies between 0.25" to 0.75". The arc-shaped cross-section extends entirely through the length of the body and thereby forms a concave surface and a convex surface. The arc-shaped cross-section has a width of approximately 0.5" and a thickness of approximately 0.0625" (i.e., when viewed from an end perspective). The concave surface defines a first contact surface for thermally-coupling to a portion of a suction line. The convex surface of the body defines a second contact surface for thermally-coupling to a sensory bulb of an expansion valve. The specific dimension are not intended to be limiting but to offer one illustrative embodiment.

According to an illustrative embodiment, a method for stabilizing suction pressure within a heating, ventilating, and air conditioning (HVAC) system includes the step of using a heat-flow modulator to exchange heat between refrigerant in a suction line and a sensory bulb. The HVAC system has a closed-conduit refrigeration system. The method also includes the step of fluidly-coupling the sensory bulb to an expansion valve and the step of altering the flow of refrigerant through the expansion valve in response to heat exchanged between the sensory bulb and the heat-flow modulator. The expansion valve is configured to regulate refrigerant flow within the closed-conduit refrigeration circuit is also configured to meter the flow of refrigerant (i.e., flowing through the expansion valve) to the evaporator.

In some embodiments, the heat-flow modulator comprises a modulator body having a first contact surface and a second contact surface. In such embodiments, the first contact surface is thermally-coupled to the suction line and the second contact surface is thermally-coupled to the sensory bulb.

In some embodiments, the step of using a heat-flow modulator to exchange heat includes the step of directing heat along a predetermined thermal flow path of the heat-flow modulator. In some embodiments, the method further includes the step of conveying refrigerant from the evaporator to a compressor via a suction line.

In some embodiments, the step of using the heat-flow modulator to exchange heat includes flowing heat from the suction line through a first contact surface of the heat-flow modulator. In some embodiments, the step of using the heat-flow modulator to exchange heat includes flowing heat from the suction line through a first contact surface of the heat-flow modulator and through a second contact surface into the sensory bulb.

In some embodiments, the step of using the heat-flow modulator to exchange heat includes the step of flowing heat from the suction line through the first contact surface of the heat-flow modulator and through the second contact surface into the sensory bulb. In such embodiments, the method also includes the step of flowing heat from the suction line through at least one bracket into the sensory bulb.

In some embodiments, the step of altering the flow of refrigerant through the expansion valve includes the step of decreasing an occlusion of a fluid-flow orifice in the expansion valve in response to heat entering the sensory bulb. In these embodiments, the method also includes the step of increasing the occlusion of the fluid-flow orifice in the expansion valve in response to heat leaving the sensory bulb.

In some embodiments, the heat-flow modulator includes a body having a first concave portion and a second concave portion. In some embodiments, the heat-flow modulator includes a thermally-insulating material. In other embodiments, the heat-flow modulator includes thermally-conducting material.

While not limited to any certain theory, in some embodiments, it may be useful to consider that the heat-flow modulator can modulate heat between the suction line and bulb using the following formula=kA(T_bulb−T_suction)/t, where k=thermal cond, A—contact area, t-thickness of modulator. Any one of the components (k, A, or t) can be changed to modulate. If an effective A and effective t were imagined, then either of these can be adjusted to modulate heat transfer rate. Change in material is one of these choices—a change in k. It should be appreciated that the shape and size can also be changed to optimize the modulator. The volume between the sensory bulb and suction line may also be modified to vary the thermal energy transfer characteristics.

Figure 4A:
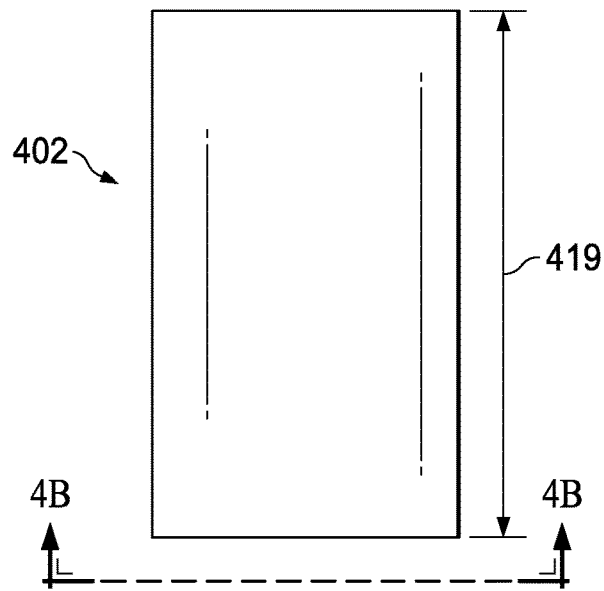
FIG. 4A is a plan view of another illustrative embodiment of a heat-flow modulator.
Figure 4B:
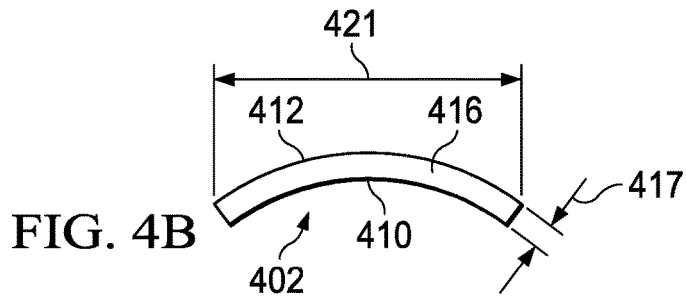
FIG. 4B is an end elevation view of the illustrative embodiment of a heat-flow modulator of FIG. 4A.

Referring now primarily to FIGS. 4A and 4B, another illustrative embodiment of a heat-flow modulator 402 is presented. The heat-flow modulator 402 has a body with an arced or curved side profile as shown in FIG. 4B. The body has a first contact surface 410 and an opposing, second contact surface 412. The body has a thickness 417, a length 419, and a width 421. The dimensions of the heat-flow modulator 402 may vary with application to different HVAC systems based on the system charge, expansion valve size, refrigerant volume, etc. As one illustrative, non-limiting example, in a monitored operation, the following dimensions and results were used:

| L (inches) 419 | W (inches) 421 | T (inches) 417 | Operation Status | Startup |
|---|---|---|---|---|
| 0.25 | 0.5 | 0.0625 | Stable | Low S. Heat |
| 0.50 | 0.5 | 0.0625 | Stable | Adequate |
| 0.75 | 0.5 | 0.0625 | Stable | Adequate |
| 1.00 | 0.5 | 0.0625 | Unstable | — |

In this example, the heat-flow modulator 402 was attached to the suction line and the sensory bulb to the heat-flow modulator 402. The operation involved a 10-ton unit with two five-ton compressors and MCHX® condenser. It was with an indoor set point of typically 75° F. During the test, the outdoor temperature ranged from 80-95° F. The sensory bulb used was approximately two inches in length. As one can see, the 0.5 inch and 0.75 inch long heat-flow modulator 402 worked well for operation (e.g., stable suction pressure and super heat at partial load) and also acceptable super heat at startup (within a few minutes). The smaller and larger lengths were not stable or had low super heat at startup. In terms of effective volume between the sensory bulb and suction line, the stable effective volumes for this non-limiting example were: 0.0078125 in$^3$, 0.015625 in$^3$, and 0.0234375 in$^3$. The surface area was approximately 0.125 in$^2$, 0.25 in$^2$, 0.5 in$^2$. The volume of material or contact surface area impacts the thermal energy flow, and the desired range is not too small or too large. This may be determined for different systems by inserting different flow modulator sizes and tracking performance. One possibility on the predicative side is that if one can calculate the rate of conduction, then the response time would be directly related to that rate; so if one wanted to cut the response time in half, one cuts the rate of conduction in half. The trial of different contact areas or volumes may be varied in the field using a variable heat-flow modulator as discussed further below in connection with FIGS. 5 and 9.

Figure 5A:
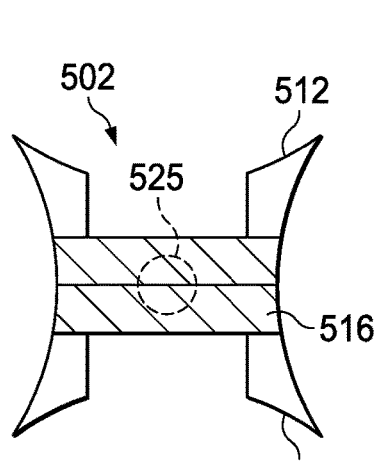
FIG. 5A is a cross section view of another illustrative embodiment of a heat-flow modulator taken along path 5A-5A of FIG. 5B.
Figure 5B:
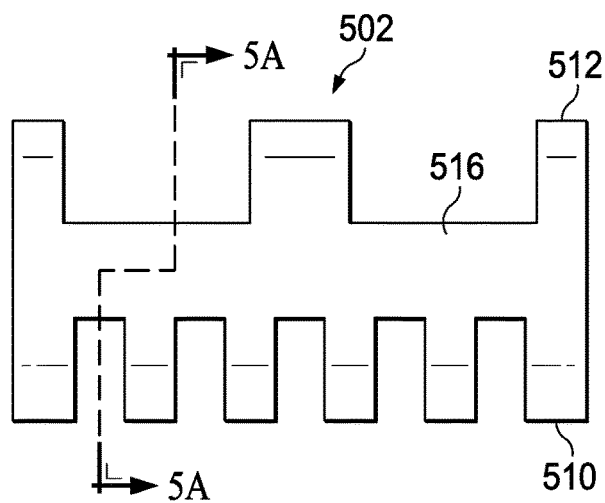
FIG. 5B is a side elevation view of the heat-flow modulator of FIG. 5A.
Figure 9:
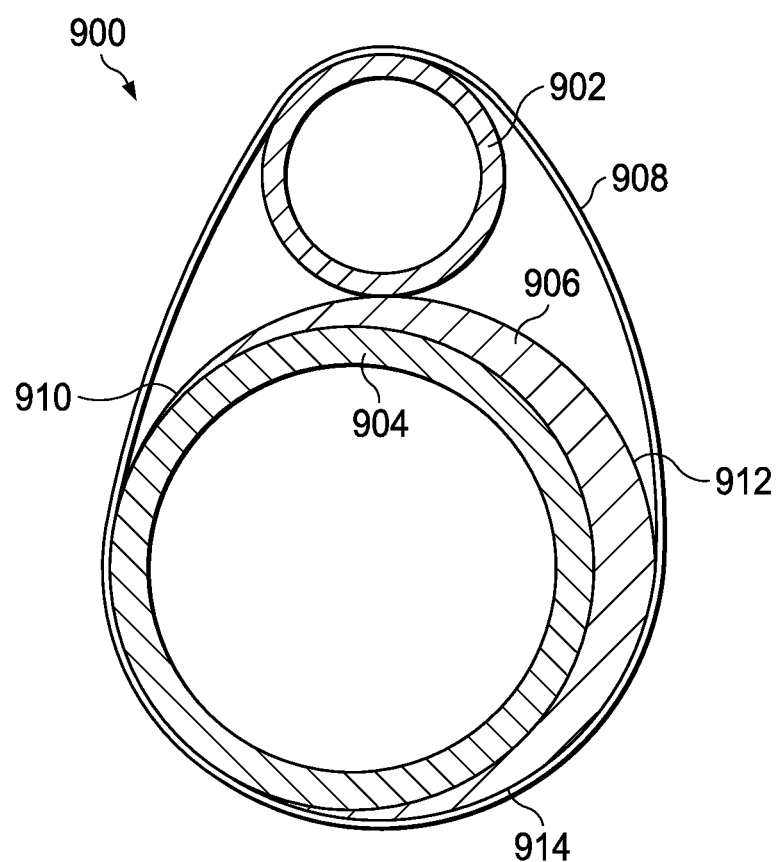
FIG. 9 is a schematic, cross sectional view of a suction line and sensory bulb with an illustrative embodiment of a variable heat-flow modulator coupled therebetween.

In some situations, it is desirable to have a heat-flow modulator that can be adjusted in the field by how it is applied. FIGS. 5A, 5B, and FIG. 9 present such heat-flow modulators. Referring now primarily to FIGS. 5A and 5B, a variable area heat-flow modulator 502 is presented. The heat-flow modulator 502 has a body 516 shaped with an arced or curved surface on two sides (see FIG. 5A). The body 516 has a first contact surface 510 and an opposing, second contact surface 512. The contact surface between the heat-flow modulator 502 and the suction line may be varied at installation according to whether the first contact surface 510 or the second contact surface 512 is placed against the suction line. As will be apparent from the side elevation view of FIG. 5B, if the first side, or first contact surface 510, is placed against the suction line, more thermal energy will be received because of the greater surface area interacting (more prongs contacting). If the second side, or second contact surface 512, is placed against the suction line, less thermal energy (compared to the first configuration) will be transferred through the heat-flow modulator 502 (less prongs contacting). The first side of the heat-flow modulator provides for a first contact area and the second side of the heat-flow modulator provides for a second contact area different from the first contact area by more than 10% in one illustrative embodiment and still other embodiments different by more than 5%, or more than 20%.

The sensory bulb is then coupled to whichever side is not being used, i.e., coupled to the side not against the suction line. In one alternative embodiment still, an optional conductor element 525 (shown in broken lines) may be inserted or removed from a conduit formed in the body 516 to impede (when absent) or facilitate (when present) the transfer of thermal energy across the body 516. FIG. 9 discussed further below presents another heat-flow modulator 906 with variable transfer rates according to how installed.

With the various embodiments of the heat-flow modulators 102, 202, 302, 402, 502, 906, the heat-flow modulator regulates the thermal energy transferred between the suction line and the sensory bulb in a way advantageous to the performance of the HVAC system. This means, for example, that the HVAC system will oscillate less with respect to suction pressure or discharge pressure at partial load and transitions to full load than it would without a heat-flow modulator installed. Referring now primarily to FIGS. 6A-6B, 7A-7B, and 8A-8B, illustrative, non-limiting examples will be presented.

In the illustrative, non-limiting example of FIGS. 6A and 6B, a roof-top HVAC unit was utilized having a tandem compressor and similar to that associated with the table above but with a tube-fin condenser (not an MCHX® condenser). FIG. 6A shows a curve 600—presented mainly for qualitative purposes—of the suction pressure (ordinate axis, or y axis) against time (abscissa, or x axis) during partial load without a heat-flow modulator. While presented mainly for qualitative purposes, note that the suction pressure fluctuations or oscillations of about 8-10 psig occurred about a pressure center of about 155 psig or so. Referring now primarily to FIG. 6B, the same HVAC system was operated with a heat-flow modulator installed and again at partial load. As shown by curve 602, the suction pressure stabilized around a center pressure quicker than it did without the heat-flow modulator and experienced oscillations with a smaller amplitude, i.e., a smoother curve. The oscillations in this situation were about 2-4 psig, which is about 40-75% less than when operated without a heat-flow modulator. It also reduced discharge pressure fluctuations from 3-6 psig to 1-2 psig. The superheat fluctuations may also be reduced.

Figure 7A:
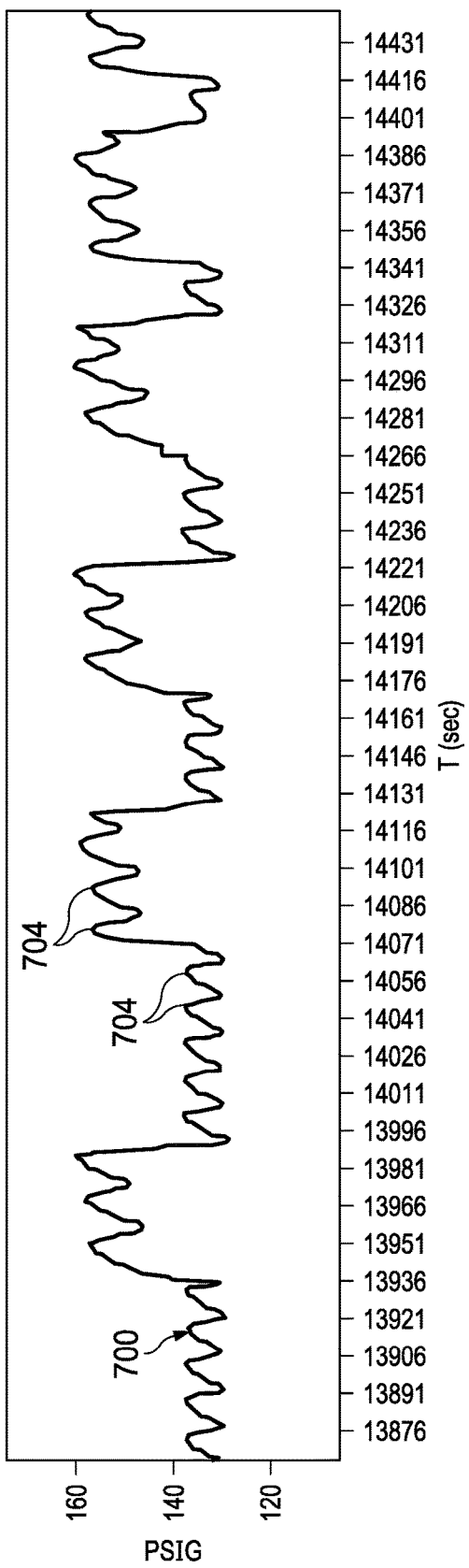
FIG. 7A is an illustrative graph of performance data for the roof-top HVAC system represented in FIG. 6A without a heat-flow modulator and showing mainly the qualitative nature of the data during transition from partial load to full load.
Figure 7B:
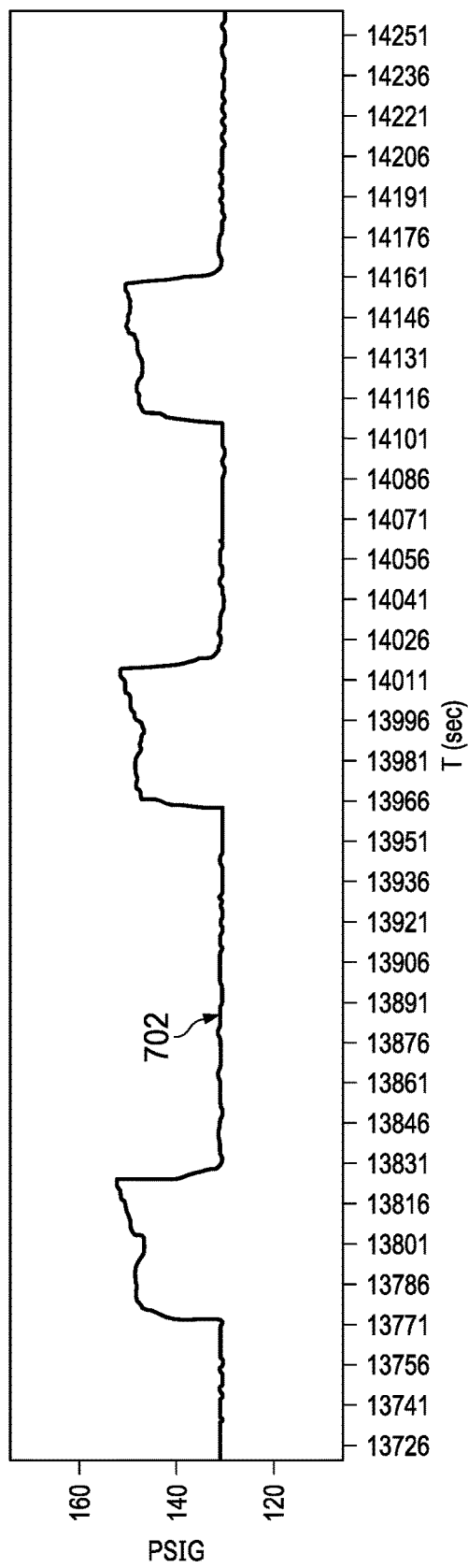
FIG. 7B is an illustrative graph of performance data for the roof-top HVAC system represented in FIG. 7A without a heat-flow modulator and showing mainly the qualitative nature of the data during transition from partial load to full load.
Figure 8A:
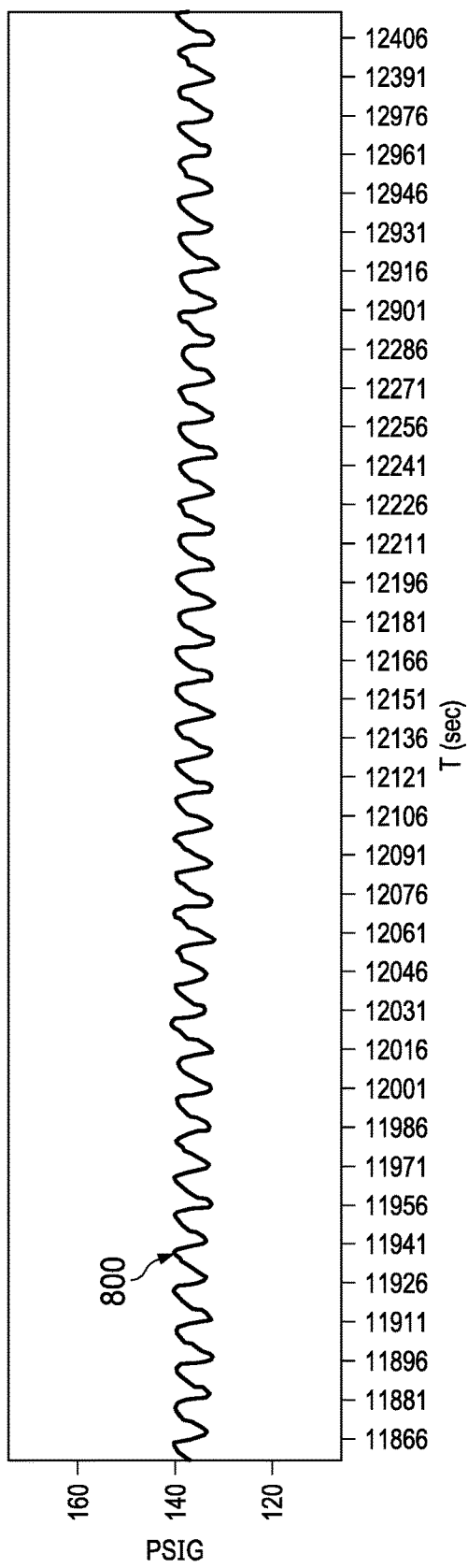
FIG. 8A is an illustrative graph of performance data for the roof-top HVAC system represented in FIG. 6A without a heat-flow modulator and showing mainly the qualitative nature of the data during full load.
Figure 8B:
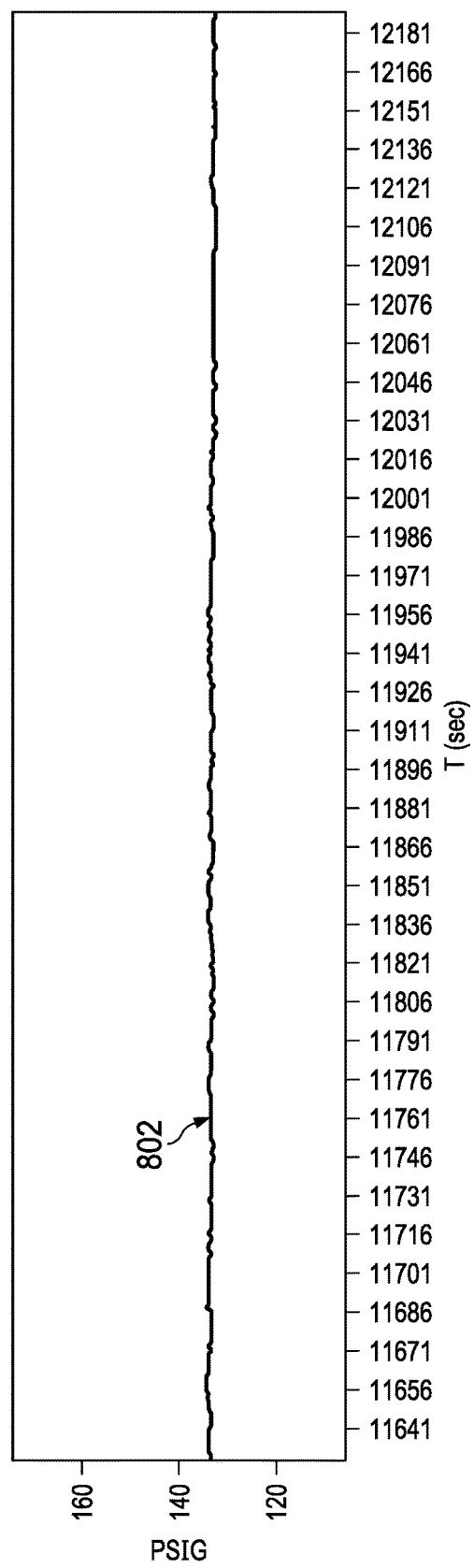
FIG. 8B is an illustrative graph of performance data for the roof-top HVAC system represented in FIG. 6A with a heat-flow modulator and showing mainly the qualitative nature of the data during full load.

Likewise, the HVAC system performed better in transitions between partial load and full load when the HVAC system had a heat-flow modulator in place between the suction line and sensory bulb. This is shown qualitatively by comparing FIGS. 7A and 7B. The curve 700 of FIG. 7A is for the partial load to full load transition without a heat-flow modulator and shows the suction pressure (ordinate, or y axis) against time (abscissa, or x axis). The curve 702 in FIG. 7B is the same HVAC system with the heat-flow modulator installed. In this transition, one may note how much smoother—less oscillations—the curve is with the heat-flow modulator in place. In particular, the oscillations 704 (FIG. 7A) are not found in curve 702 of FIG. 7B. Similarly, as shown in FIGS. 8A and 8B, this is also true for the full load situation as one compares curves 800 and 802. Curve 800 is the suction pressure for the HVAC system at full load without a heat-flow modulator. Curve 802 is the suction pressure for the HVAC system at full load with the heat-flow modulator between the suction line and the sensory bulb.

In each instance, one may see that the oscillations are at least 10% less with the heat-flow modulator installed than they would be without the heat-flow modulator installed. Moreover, often the oscillation decrease is even more dramatic, e.g., oscillations 10% to 75% less than they would be without the heat-flow modulator installed. The rate of heat transfer is adjusted to cause the improved results.

Referring now primarily to FIG. 9, another illustrative embodiment of a heat-flow modulator arrangement 900 is presented. FIG. 9 is a cross section analogous to that of FIG. 2B. In this arrangement, a heat-flow modulator 906 is disposed between the sensory bulb 902 and the suction line 904. A bracket or band 908 goes around the sensory bulb 902 and the suction line 904 and a portion of the heat-flow modulator 906. The bracket or band 908 holds the items together in a secure position. In this embodiment, one will appreciate that the heat-flow modulator 906 has a modulator body that in cross section is shaped like a crescent moon with a first thin tail portion 910, a thicker middle section 912 and a second thin tail portion 914. The thickness may vary between the middle section 912 and the two tail portions 910, 914. The variation in thickness allows the heat transfer characteristics to be varied between the tails and the middle section. In one illustrative embodiment, the cross section need not by symmetric about a mid-line, but could have one tail thicker than the other. Again, as with other modulators herein, the heat-flow modulator may be formed from any heat conducting material, e.g., a metallic material, copper, type k copper, aluminum, steel, or the like. In one illustrative example, type k copper was used for the heat-flow modulator. Other materials referenced elsewhere herein for heat-flow modulators might also be used.

With the variable geometry of the heat-flow modulator 906, the technician installing the heat-flow modulator 906 may vary the thickness of the heat-flow modulator 906 that is positioned between the sensory bulb 902 and the suction line 904 by adjusting the rotational position of the heat-flow modulator 906 about the suction line 904. If the greatest thickness is desired, the middle section 912 is placed directly between the sensory bulb 902 and the suction line 904. If the thinnest thickness is desired, one of the end tails 910, 914 or as close as possible is positioned between the sensory bulb 902 and the suction line 904. Once in the desired position, the band or bracket 908 is secured. As used herein, effective volume means the volume of material of the heat-flow modulator directly between the sensory bulb 902 and the suction line 904. The effective area is the area between the sensory bulb and the heat-flow modulator that are in contact or the area between the suction line and the heat-flow modulator that are in contact as specified. Thus, the heat-flow modulator 906 may be rotated to adjust the effective thickness and thereby the effective volume. In an alternative embodiment, channels may be formed on the exterior of the heat-flow modulator 906 that run parallel to the suction line when installed to cause more effective area between the suction bulb and heat-flow modulators at various positions.

In one illustrative embodiment a method for stabilizing suction line pressure in a heating, ventilating, and air conditioning system that includes providing a heat-flow modulator. The heat-flow modulator includes a body having a first side and a second side, wherein the first side has a first curved surface and the second side has a second curved surface, and wherein the body is formed from a metallic material. The method further involves disposing the heat-flow modulator between the suction line and a sensory bulb; securing with a bracket the heat-flow modulator between the suction line and the sensory bulb; and adjusting the heat-flow modulator to have an effective volume between a suction line and a sensory bulb such that oscillations in the suction line pressure are at least five percent less than oscillations in the suction line pressure for an identical heating, ventilating, and air conditioning system without the heat-flow modulator and otherwise operating at identical conditions. In an illustrative embodiment for a commercial roof top HVAC system, the effective volume is greater than or equal to 0.0078125 in$^3$ and less than or equal to 0.0234375 in$^3$.

Although the present invention and its advantages have been disclosed in the context of certain illustrative, non-limiting embodiments, it should be understood that various changes, substitutions, permutations, and alterations can be made without departing from the scope of the invention as defined by the appended claims. It will be appreciated that any feature that is described in connection to any one embodiment may also be applicable to any other embodiment to the extent they do not conflict.

It will be understood that the benefits and advantages described above may relate to one embodiment or may relate to several embodiments. It will further be understood that reference to "an" item refers to one or more of those items.

The steps of the methods described herein may be carried out in any suitable order or simultaneously where appropriate. Where appropriate, aspects of any of the examples described above may be combined with aspects of any of the other examples described to form further examples having comparable or different properties and addressing the same or different problems.

It will be understood that the above description of the embodiments is given by way of example only and that various modifications may be made by those skilled in the art. The above specification, examples, and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

In the detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the scope of the invention. To avoid detail not necessary to enable those skilled in the art to practice the embodiments described herein, the description may omit certain information known to those skilled in the art. The detailed description above is, therefore, not to be taken in a limiting sense, and the scope of the illustrative embodiments is defined only by the appended claims.

In the drawings and description herein, like parts are typically marked throughout the specification and drawings with the same reference numerals or coordinated numerals. The drawing figures are not necessarily to scale. Certain features of the illustrative embodiments may be shown exaggerated in scale or in somewhat schematic form and some details of conventional elements may not be shown in the interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

As used herein, the phrases "fluidly coupled," "fluidly connected," and "in fluid communication" refer to a form of coupling, connection, or communication related to fluids, and the corresponding flows or pressures associated with these fluids. In some embodiments, a fluid coupling, connection, or communication between two components may also describe components that are associated in such a way that a fluid can flow between or among the components. Such fluid coupling, connection, or communication between two components may also describe components that are associated in such a way that fluid pressure is transmitted between or among the components.

As used herein, the terms "hot," "warm," "cool," and "cold" refer to thermal states, on a relative basis, of refrigerant within a closed-conduit refrigeration circuit. Temperatures associated with these thermal states decrease sequentially from "hot" to "warm" to "cool" to "cold". Actual temperatures, however, that correspond to these thermal states depend on a design of the closed-conduit refrigeration circuit and may vary during operation.

The invention claimed is:

1. A method for stabilizing suction line pressure in a heating, ventilating, and air conditioning system, the method comprising:
providing a heat-flow modulator, wherein the heat-flow modulator comprises:
a body having a first side and a second side, wherein the first side has a first curved surface and the second side has a second curved surface, and
wherein the body is formed from a metallic material;
disposing the heat-flow modulator between the suction line and a sensory bulb;
securing with a bracket the heat-flow modulator between the suction line and the sensory bulb; and
adjusting the heat-flow modulator to have an effective volume between a suction line and a sensory bulb such that oscillations in the suction line pressure are at least five percent less than oscillations in the suction line pressure for an identical heating, ventilating, and air conditioning system without the heat-flow modulator.

2. The method of claim 1, wherein the effective volume is greater than or equal to 0.0078125 in$^3$ and less than or equal to 0.0234375 in$^3$.

3. The method of claim 1, wherein the heat-flow modulator has a variable geometric shape.

4. The method of claim 3, wherein the heat-flow modulator is shaped like a crescent moon.

5. The method of claim 3, wherein the heat flow modulator has a first surface area on a first side and a second surface area on a second side, wherein the first surface area is different than the second surface area.

6. The method of claim 3, wherein the heat flow modulator has a first surface area on a first side and a second surface area on a second side, wherein the first surface area is different than the second surface area by at least 10 percent.

7. A heating, ventilating, and air conditioning system comprising:
a closed-conduit refrigeration circuit comprising:
an expansion valve fluidly coupled to a sensory bulb, the expansion valve configured to regulate refrigerant flow within the closed-conduit refrigeration circuit,
an evaporator fluidly-coupled to the expansion valve via a refrigeration line,
a compressor fluidly-coupled to the evaporator via a suction line, and
a condenser fluidly-coupled to the compressor and to the expansion valve,
a heat-flow modulator, the heat-flow modulator comprising a modulator body having a first contact surface and a second contact surface, the first contact surface thermally-coupled to the suction line and the second contact surface thermally-coupled to the sensory bulb; and
wherein a heat flow across the heat-flow modulator is governed by $kA(T\_bulb-T\_suction)/t$, where k is thermal conductivity, A is contact area, t is thickness of the heat-flow modulator, and wherein A and t and k are selected such that the heat flow rate across the heat-flow modulator is less than a heat flow rate otherwise would be between the suction line and sensory bulb without the heat-flow modulator whereby the system oscillates at least five percent less with respect to suction line pressure than the heating, ventilating, and air conditioning system would without the heat-flow modulator.

8. The system of claim 7, wherein the first contact surface is formed on the modulator body as a first concave portion and the second contact surface is formed as a second concave portion facing away from the first concave portion.

9. The system of claim 7, wherein the modulator body has a rectilinear cross-section.

10. The system of claim 7, further comprising at least one bracket member for urging a portion of the suction line toward the first contact surface of the heat-flow modulator and for urging at least a portion of the sensory bulb toward the second contact surface of the heat-flow modulator.

11. The system of claim 7, wherein the modulator body has a crescent moon shape in cross section.

12. The system of claim 7, wherein the first side of the heat-flow modulator provides for a first contact area and the second side of the heat-flow modulator provides for a second contact area different for from the first contact area by more than 10 percent.

13. The system of claim 7, wherein the first side of the heat-flow modulator provides for a first contact area and the second side of the heat-flow modulator provides for a second contact area different for from the first contact area by more than 20 percent.

14. A method for stabilizing suction pressure within a heating, ventilating, and air conditioning (HVAC) system, the system having a closed-conduit refrigeration circuit, the method comprising:
   disposing a heat-flow modulator between and in contact with a suction line and a sensory bulb, wherein the heat flow modulator has a body, a first side, and a second side;
   using the heat-flow modulator to exchange heat between refrigerant in the suction line and the sensory bulb;
   fluidly-coupling the sensory bulb to an expansion valve, wherein the expansion valve is configured to regulate refrigerant flow within the closed-conduit refrigeration circuit;
   altering a flow of refrigerant through the expansion valve in response to heat exchanged between the sensory bulb and the heat-flow modulator;
   wherein the expansion valve is configured to meter the flow of refrigerant to the evaporator; and
   wherein the heat-flow modulator exchanges heat smoother and slower than would be the case without the heat-flow modulator whereby the suction pressure has at least two percent smaller oscillations than the suction line pressure would without the heat-flow modulator under the same conditions.

15. The method of claim 14, wherein said altering the flow of refrigerant through the expansion valve comprises:
   decreasing an occlusion of a fluid-flow orifice in the expansion valve in response to heat entering the sensory bulb; and
   increasing the occlusion of the fluid-flow orifice in the expansion valve in response to heat leaving the sensory bulb.

16. The method of claim 14, wherein the heat-flow modulator has a variable geometric shape.

17. The method of claim 16, wherein the heat-flow modulator is shaped like a crescent moon.

18. The method of claim 16, wherein the first side of the heat-flow modulator provides for a first contact area and the second side of the heat-flow modulator provides for a second contact area different for from the first contact area by more than 10 percent.

* * * * *